United States Patent [19]

Frau

[11] 4,286,001
[45] Aug. 25, 1981

[54] PROCESS FOR THE PRODUCTION OF INDUSTRIAL PARTS OF SYNTHETIC MATERIAL COMPRISING A RIGID PORTION SURMOUNTED BY A FLEXIBLE PORTION AND THE INDUSTRIAL PART PRODUCED BY SAID PROCESS

[75] Inventor: Giuliano Frau, Mareil sur Mauldre, France

[73] Assignee: Les Manufactures de Saint Marcel, France

[21] Appl. No.: 93,069

[22] Filed: Nov. 13, 1979

[30] Foreign Application Priority Data

Sep. 27, 1979 [FR] France .................. 79 24118

[51] Int. Cl.³ .................. B32B 3/02; B32B 3/04
[52] U.S. Cl. .................. 428/68; 264/45.1; 264/46.4; 264/219; 264/250; 236/35.2
[58] Field of Search ............ 264/45.1, 46.4, 46.6, 264/46.7, 219, 250, 225, 220, 221; 236/35.2; 428/68

[56] References Cited

U.S. PATENT DOCUMENTS

| 3,123,403 | 3/1964 | Hood | 264/225 |
| 3,466,700 | 9/1969 | Harrison | 264/46.4 |
| 3,478,134 | 11/1969 | Gruss et al. | 264/46.4 |
| 3,929,948 | 12/1975 | Welch et al. | 264/46.4 |
| 4,106,658 | 8/1978 | Brandon | 264/46.4 |
| 4,118,553 | 10/1978 | Buckethal et al. | 264/219 |

Primary Examiner—Donald E. Czaja
Assistant Examiner—W. Thompson
Attorney, Agent, or Firm—Hubbard, Thurman, Turner, Tucker & Glaser

[57] ABSTRACT

The present invention concerns a process for the production of industrial parts of synthetic material comprising a portion of a rigid material surmounted by a portion of a flexible material, and in particular industrial parts serving as a means for making a seal between different parts of heating or air-conditioning equipment.

10 Claims, 5 Drawing Figures

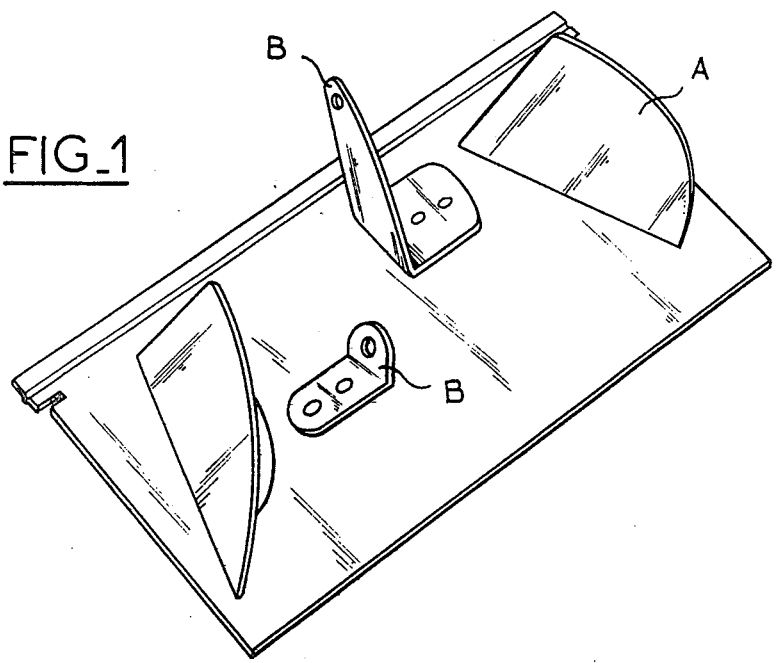
FIG_1
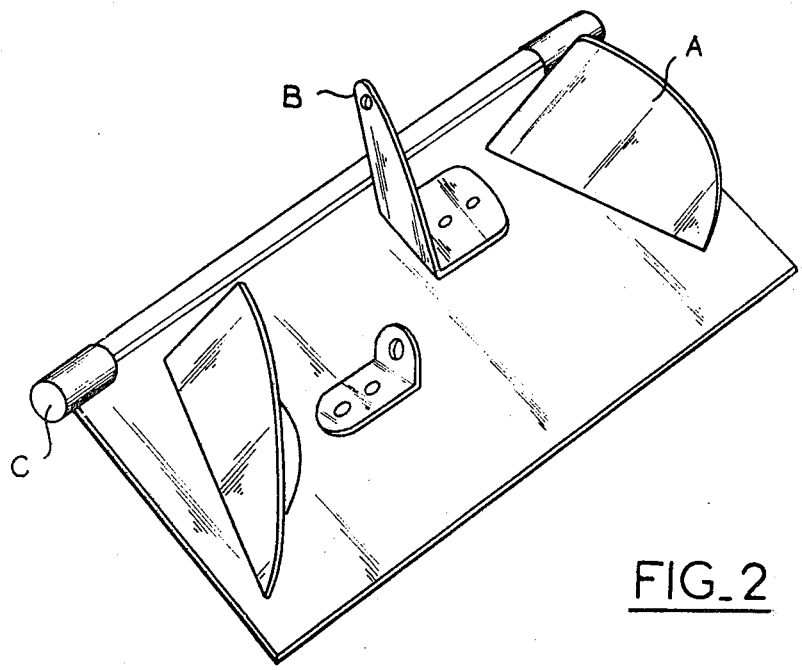
FIG_2

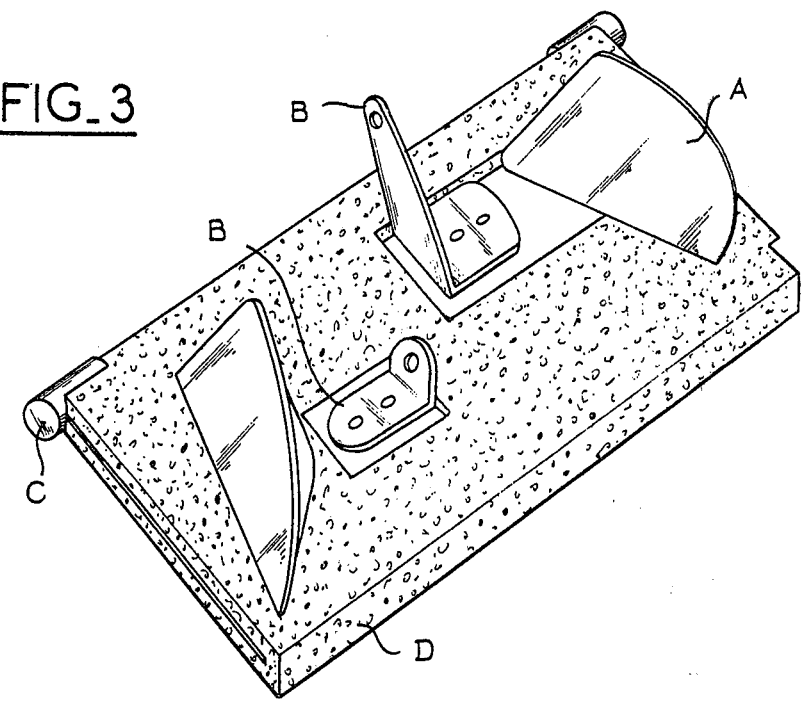
FIG_3
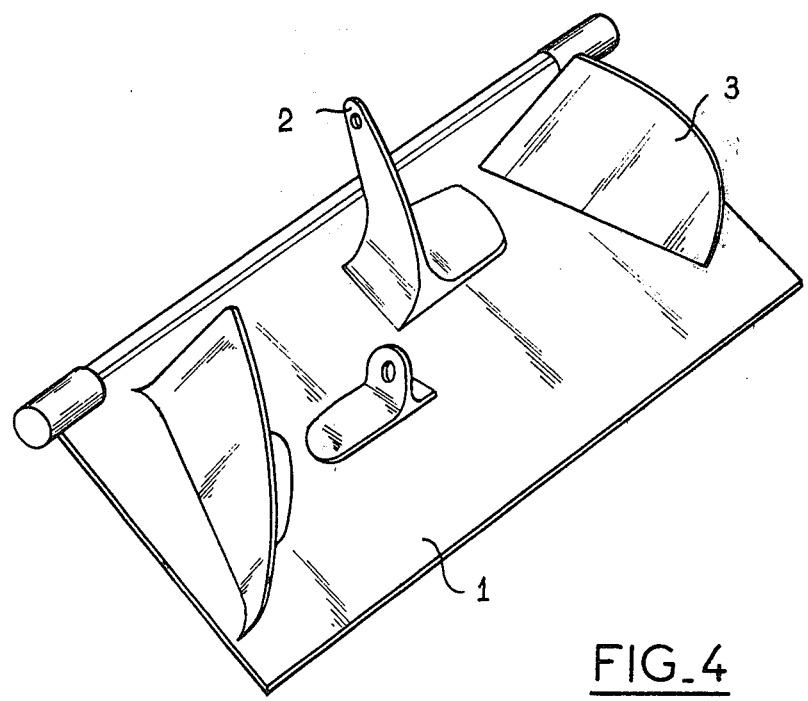
FIG_4

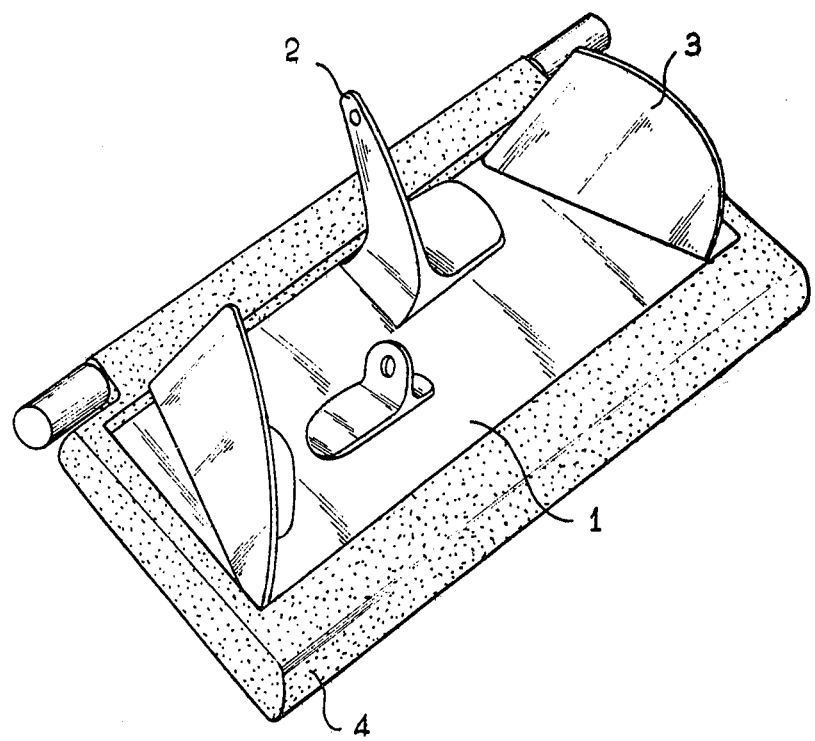
FIG_5

PROCESS FOR THE PRODUCTION OF INDUSTRIAL PARTS OF SYNTHETIC MATERIAL COMPRISING A RIGID PORTION SURMOUNTED BY A FLEXIBLE PORTION AND THE INDUSTRIAL PART PRODUCED BY SAID PROCESS

The present invention concerns a process for the production of industrial parts of synthetic material comprising a portion of a rigid material which is surmounted by a portion of a flexible material, which is provided for example for the purposes of insulation. This process is more particularly concerned with industrial parts which are used to provide a seal between different parts of heating or air-conditioning equipment.

The present invention also concerns industrial parts produced in accordance with this process.

Generally, in heating or air-conditioning equipment or in other industrial equipment of this type, a sealing effect is achieved by means of metal or plastics shutters or flaps on to which mainly open-cell polyurethane foams are secured by adhesive, in order to achieve the lowest possible densities and therefore the lowest possible weights. These shutters which are an integral part of the equipment may be opened or closed by means of a system of levers which are pivotally connected to hinges or to metal strengthening members which have previously been welded or fixed on to the shutter itself.

Consequently, manufacture of such shutter flaps is complex and of high cost, insofar as it is necessary to cut out, stamp, and weld the strengthening members A and the hinges B (FIG. 1), set bearing members (for example of plastics) in position, treat the metal surface against atmospheric or other agents, cut out the polyurethane foam, apply adhesive to the shutter, possibly apply adhesive to the foam D, and finally stick the foam on to the shutter; furthermore, the open cells of the foam give rise to the disadvantage that they absorb water or allow air to pass.

The present invention is concerned with a process which makes it possible to overcome these disadvantages by eliminating a part of the operations which were previously necessary, and therefore making it possible to produce an industrial part such as an insulation shutter flap in a very short time, with little waste, and which has a water-impermeable and air-impermeable surface.

For this purpose, the present invention concerns a process of the above type, characterised by making a model of the rigid portion of the part, producing a first mould corresponding to said model, then sticking to the model an additional material of shape and dimensions corresponding to the shape and dimensions of the flexible portion, producing a second mould corresponding to the model surmounted by the additional material, placing the first mould on an injection machine and injecting the rigid material in order to produce the main frame portion of the part which is placed in the second mould, placing the second mould provided with the main frame portion of rigid material on a casting machine, and casting the flexible material to produce the part.

In accordance with another feature of the invention, the rigid material used is a compact polyurethane with high mechanical properties with a density of the order of 1 g/cm$^3$.

The compact polyurethane may be produced in particular from straight chain polyethylene adipate with a molecular weight of 2 to 4000, diphenyl methane isocyanate and 1,4-butane diol.

In accordance with another feature of the invention, the flexible material is a polyurethane foam with a density of from 0.2 to 0.6 g/cm$^3$ and surface hardness of from 10° to 30° sh.A.

Preferably, the foam comprises from 60 to 80% of open cells and from 20 to 40% of closed cells, which makes it possible substantially to reduce the density of the flexible portion.

As the surface of the part is produced by contact of the material and the walls of the mould at a temperature of 40° to 50° C., it is possible to produce a foam which has a surface that is impermeable to air, water, etc.

The two moulds may be produced from epoxy resins but preferably the material used will be aluminium. Indeed, as these moulds are used for the injection moulding of polyurethane and must therefore be treated with polytetrafluoroethylene or fluoroethylenepropylene, it is advantageous to avoid using a mould-release agent of the silicone or wax type.

The originality of the process according to the present invention is that it makes it possible to use rigid high-performance polyurethane to produce an industrial part such as a shutter over which a cellular polyurethane will be foamed in order in two operations to produce a sealing shutter for a heating, air-conditioning or like apparatus. All the accessory components such as hinges, reinforcing members . . . can thus be produced in the first injection operation, in a single step, while the cellular sealing joint is produced during the second casting operation.

The present specification describes more particularly an example of use of this process for the production of sealing shutters or flaps for air-conditioning equipment, but it will be appreciated that the process could also be used for the manufacture of other industrial parts without thereby departing from the scope of the invention.

In addition, the invention also concerns any industrial parts produced by the above-described process.

The process which is the subject of the present invention will be described in greater detail with reference to the accompanying drawings wherein:

FIG. 1 shows the main frame portion of a sealing shutter flap produced by the prior-art process, FIG. 2 shows the main frame portion of FIG. 1 to which plastics bearings have been added, FIG. 3 shows a sealing shutter produced by the prior-art process, FIG. 4 shows the main frame portion of a sealing shutter produced by the process of the invention, and FIG. 5 shows such a sealing shutter.

Referring to FIGS. 4 and 5, the process of the invention permits the production of a shutter or flap comprising a main rigid frame portion 1 surmounted by a flexible portion 4 which serves to provide the sealing action.

In FIG. 4, in the first phase of the process, the rigid frame portion 1 of the sealing shutter is produced first.

The main frame portion 1 which is preferably of a synthetic material such as rigid, compact polyurethane with very high mechanical characteristics is produced by injection moulding in a mould, for example of aluminium, which is itself produced from a model of the main frame portion of the shutter.

The mould provided for the main frame portion 1 therefore comprises all the rigid components of the shutter or flap, in particular the hinges 2 to which levers are pivotally connected to open or close the shutter 1.

Moreover, the main frame portion 1 also comprises metal reinforcing members 3 permitting opening or closing of the shutter in the same manner.

Referring to FIG. 5, in the second phase of the process according to the invention, a second mould is produced, corresponding to the main frame portion 1 surmounted by an additional material, in order, by a casting operation, to produce the definitive shutter corresponding to the main frame portion 1 on which there has been placed a portion 4 of a flexible material, in particular a polyurethane foam of density of from 0.2 to 0.6 g/cm$^3$ and with a surface hardness of 10° to 30° sh. A.

Thus, the process according to the invention provides for the easy and quick production of an industrial part such as an insulating shutter.

Moreover, as the surface of the shutter is produced by contact between the portion 4 and the hot wall of the mould, the portion 4 has a good sealing action with respect to air and water.

I claim:

1. Process for production of an industrial component which comprises a portion of rigid material partly surrounded by a portion of flexible material, including the steps of:
    making a model of said rigid portion;
    producing a first mould from said model;
    adding to the model additional material shaped and dimensioned to correspond to the shape and dimension of said flexible portion;
    producing a second mould from said model with said additional material thereon;
    placing said first mould in an injection moulding machine and injecting material to produce said rigid portion;
    removing said rigid portion from said first mould;
    inserting said rigid portion in said second mould;
    placing said second mould with said rigid portion inserted therein in a casting machine; and
    casting flexible material and uniting it to said rigid portion to produce said industrial component.

2. A process according to claim 1 wherein said rigid material is a compact polyurethane with high mechanical properties and whose density is of the order of 1 g/cm$^3$.

3. A process according to claim 2 wherein said compact polyurethane is produced from straight chain polyethylene adipate with a molecular weight of from 2 to 4000, diphenyl methane isocyanate and 1, 4-butane diol.

4. A process according to claim 1 in which said flexible material is a polyurethane foam whose density is from 0.2 to 0.6 g/cm$^3$ and whose surface hardness is from 10 to 300 sh. A.

5. A process according to claim 1 in which said polyurethane foam comprises from 60 to 80% of open cells and from 20 to 40% of closed cells.

6. A process according to claim 1 in which the moulds are of epoxy resins.

7. A process according to claim 1 in which the moulds are of aluminum.

8. An industrial part when produced by the process according to claim 1.

9. Process for production of a sealing shutter of a heating, or air-conditioning, system which comprises a rigid portion consisting of hinges and bearing members of the shutter and a flexible portion at least partially surmounting said rigid portion, comprising the steps of:
    making a model of said rigid portion;
    producing a first mould from said model;
    adding to said model additional material shaped and dimensioned to correspond to the shape and dimension of said flexible portion of said shutter;
    producing a second mould from said model with said additional material thereon;
    forming within said first mould by injection moulding said rigid portion of the shutter composed of a compact poly urethane with a density of the order of 1 g/cm$^3$;
    removing said rigid portion from said first mould;
    inserting said rigid portion thus produced in said second mould and introducing into said second mould material to form therein at a temperature of about 40° C. to about 50° C. foamed polyurethane comprising about 60 to 80% of open cells and about 20 to 40% of closed cells, having a density of from about 0.2 to 0.6 g/cm$^3$ and a surface hardness of from about 10° to 30° sh. A and which becomes united to said rigid portion of said shutter.

10. A shutter for a central heating, or air conditioning system when produced by a method according to claim 9.

* * * * *